US009841912B1

(12) United States Patent
Liang (10) Patent No.: US 9,841,912 B1
(45) Date of Patent: Dec. 12, 2017

(54) MEMORY EFFICIENT BLOCK ALLOCATION MAP TO SUPPORT ONLINE GROWTH OF DIFFERENT STORAGE ATTRIBUTES

(71) Applicant: EMC Corporation, Hopkinton, MA (US)

(72) Inventor: Shuang Liang, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 32 days.

(21) Appl. No.: 14/975,296

(22) Filed: Dec. 18, 2015

(51) Int. Cl.
  *G06F 12/00* (2006.01)
  *G06F 3/06* (2006.01)
  *G06F 17/30* (2006.01)

(52) U.S. Cl.
  CPC .......... *G06F 3/0619* (2013.01); *G06F 3/0631* (2013.01); *G06F 3/0665* (2013.01); *G06F 3/0689* (2013.01); *G06F 17/30327* (2013.01)

(58) Field of Classification Search
  CPC ................. G06F 3/0619; G06F 3/0689; G06F 17/30327; G06F 3/0631; G06F 3/0665
  USPC ....................................................... 711/114
  See application file for complete search history.

(56) References Cited

U.S. PATENT DOCUMENTS

| 7,352,739 B1 * | 4/2008 | Rangarajan ....... G06F 17/30961 370/256 |
| 8,706,701 B1 * | 4/2014 | Stefanov ........... G06F 17/30197 707/687 |
| 2011/0153976 A1 * | 6/2011 | Tamura ................ G06F 3/0608 711/170 |
| 2016/0334997 A1 * | 11/2016 | Wang .................... G06F 3/0608 |

* cited by examiner

*Primary Examiner* — Tuan Thai
*Assistant Examiner* — Tasnima Matin
(74) *Attorney, Agent, or Firm* — Blakely, Sokoloff, Taylor & Zafman LLP (57) ABSTRACT

A first tree data structure is used to track an allocation state for each block included in a first set of storage blocks. Upper level nodes in a given tree present the allocation state of connected lower level nodes in the given tree, such that each allocation state indicates whether any associated storage blocks are free. A second tree data structure is used to track an allocation state for each block included in a second set of storage blocks. The first tree data structure and the second tree data structure each have a number of leaf nodes corresponding to a maximum number of blocks that can be included in a superset of storage blocks, wherein the first set of storage blocks and second set of storage blocks are included in the superset of storage blocks. An allocation bitmap associated with the superset of storage blocks is used to track allocation states of storage blocks in the superset, wherein each leaf node of a specified tree is associated with a plurality of associated locations in the allocation bitmap.

20 Claims, 10 Drawing Sheets

MEMORY EFFICIENT BLOCK ALLOCATION MAP TO SUPPORT ONLINE GROWTH OF DIFFERENT STORAGE ATTRIBUTES

BACKGROUND OF THE INVENTION

Storage systems may be comprised of a plurality of enclosures, for example physical servers with disk controllers and disks, or logical servers with logical storage resources. An important aspect of managing storage systems includes allocation mapping to track allocation states on whether a given storage unit (for example block or bit) is free or allocated. Tracking allocation states efficiently supports online growth of enclosures.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A tree based bitmap to track states of allocation units is disclosed. Traditional methods of tracking allocation for a multi-enclosure system include using a static data structure for each enclosure, wherein the static data structure's size is determined at the time of system design. That is, if a system can be expandable to 64 enclosures, regardless of how many enclosures the actual system has, the static data structure must: (i) be sized large enough for 64 enclosures; and (ii) have a copy of the static data structure for each active enclosure in the actual system.

A tree data structure allows the allocation units to be grouped into different subsets for allocation. This allows online growth of allocation units from any allocation group, for example for an enclosure, to reach the maximum capacity supported by the system and keep the memory footprint of the data structure linear to the maximum capacity. Throughout this specification, "online growth" refers to growing an enclosure and/or growing the number of enclosures of a storage system without taking the system offline or down, or keeping at least a portion of the storage system which may be actively in use online. Thus, the disclosed reduces the existing data structure memory footprint by M times, where M is the number of allocation groups and/or enclosures supported.

Figure 1:
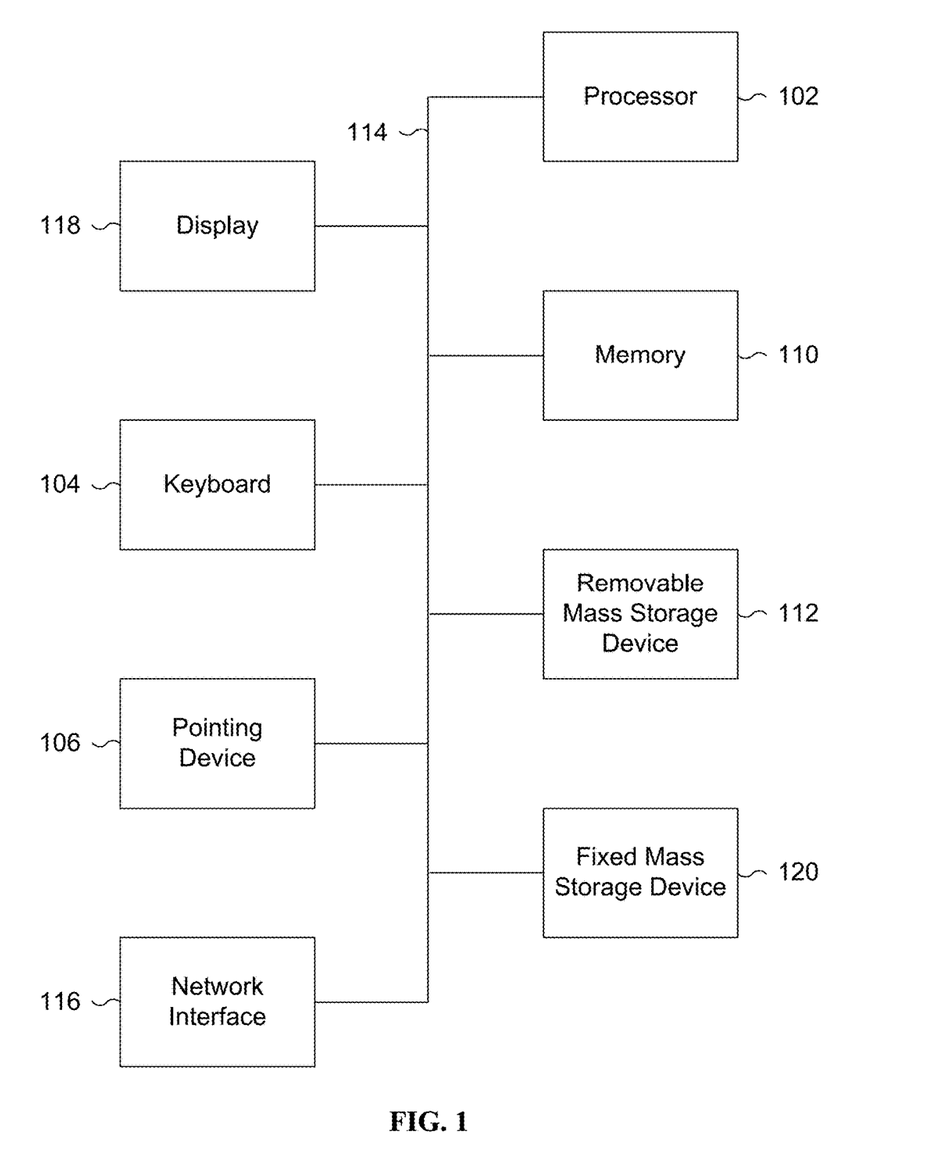
FIG. 1 is a functional diagram illustrating a programmed computer system in accordance with some embodiments.

FIG. 1 is a functional diagram illustrating a programmed computer system in accordance with some embodiments. As shown, FIG. 1 provides a functional diagram of a general purpose computer system as may represent a head server to be coupled to a plurality of enclosures with some embodiments. As will be apparent, other computer system architectures and configurations can be used to perform as head server. Computer system (100), which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system (100). Using instructions retrieved from memory (110), the processor (102) controls the reception and manipulation of input data, and the output and display of data on output devices, for example display (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system (100), and is coupled either bi-directionally (read/write) or uni-directionally (read only) to processor (102). For example, storage (112) can also include computer-readable media such as magnetic tape, flash memory, PC-CARDS, portable mass storage devices, holographic storage devices, and other storage devices. A fixed mass storage (120) can also, for example, provide additional data storage capacity. The most common example of mass storage (120) is a hard-disk drive. Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a network interface (116), a keyboard (104), and a pointing device (106), as well as an auxiliary input/output device interface, a sound card, speakers, and other subsystems as needed. For example, the pointing device (106) can be a mouse, stylus, track ball, or tablet, and is useful for interacting with a graphical user interface.

The network interface (116) allows processor (102) to be coupled to another computer, computer network, or telecommunications network using a network connection as shown. For example, through the network interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system (100) to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, IPMI, Serial ATA, 1-Wire, UNI/O, or any form of connecting homogenous, heterogeneous systems and/or groups of systems together. Additional mass storage devices, not shown, can also be connected to processor (102) through network interface (116).

An auxiliary I/O device interface, not shown, can be used in conjunction with computer system (100). The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems can also be utilized.

Figure 2:
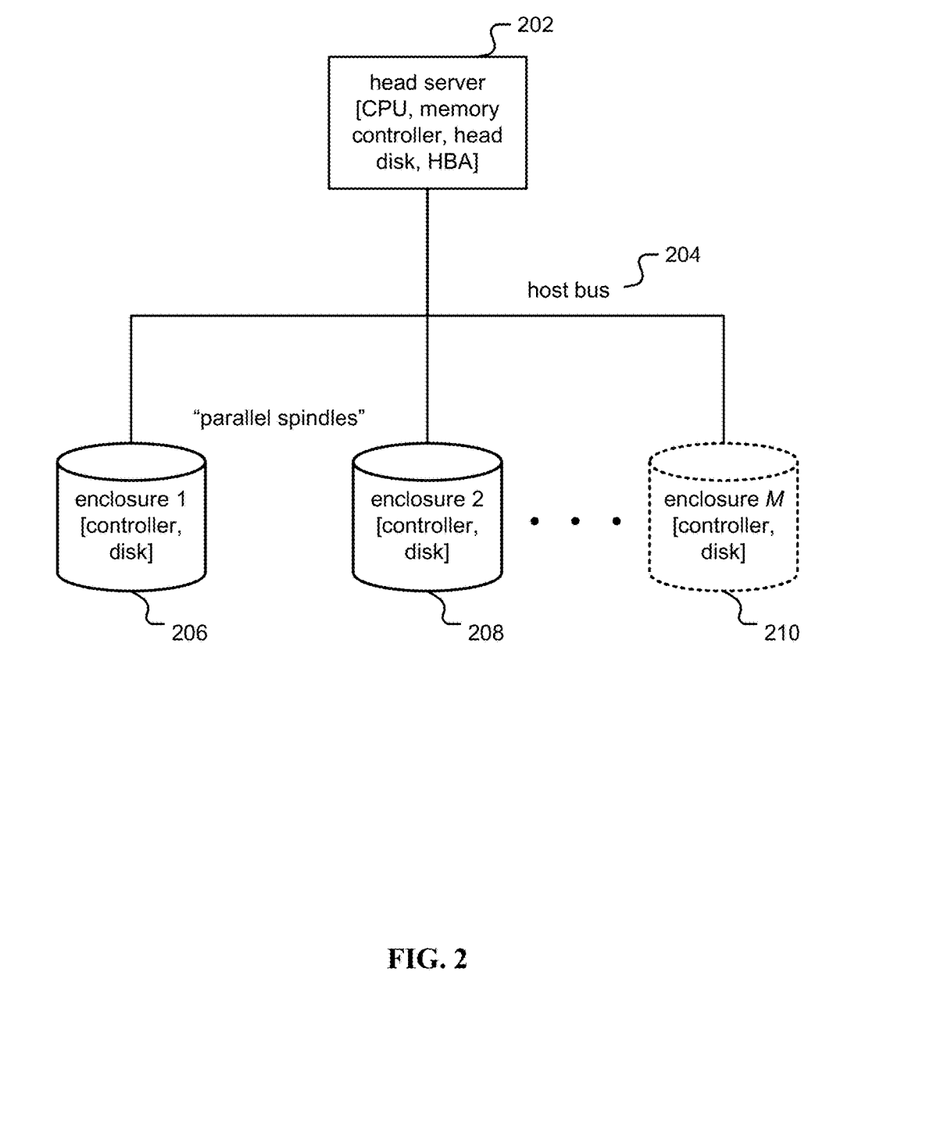
FIG. 2 is a block diagram illustrating an embodiment of a system for storage.

FIG. 2 is a block diagram illustrating an embodiment of a system for storage. Head server (202) is coupled via host bus (204) to a plurality of enclosures including a first enclosure (206), a second enclosure (208), up to an Mth enclosure (210), where M is two or more.

Head server (202) is a computer server including CPU (102), memory (110) and memory controller, a head disk (120), and an HBA (host bus adapter) (116). The HBA is coupled via host bus (204) to enclosures (206-210), wherein each enclosure includes a controller and disk. As each enclosure (206) disk, such as a SSD (solid state disk), is at least an order of magnitude slower than CPU and/or registers (102) and memory (110), the concept of "parallel spindles" is used to store/stripe data across enclosures.

Typically, a user/customer of a system as shown in FIG. 2 will not have the same number of enclosures for the system over its lifetime. They may start with a small number of enclosures (206,208) and then grow the number of enclosures to M (210) over a period of time and each enclosure may also grow its capacity over the lifetime of the system. In one embodiment, the system enforces the total max capacity among all the enclosures. For simple tasks like allocation tracking, a static data structure is used to track allocation over the maximum number of enclosure the system can support. In one embodiment, the system as shown in FIG. 2 has 56 enclosures maximum, and the static data structure keeps track of allocation up to 48 TB with a block size of 4.5 MB or 1 GB.

Figure 3:
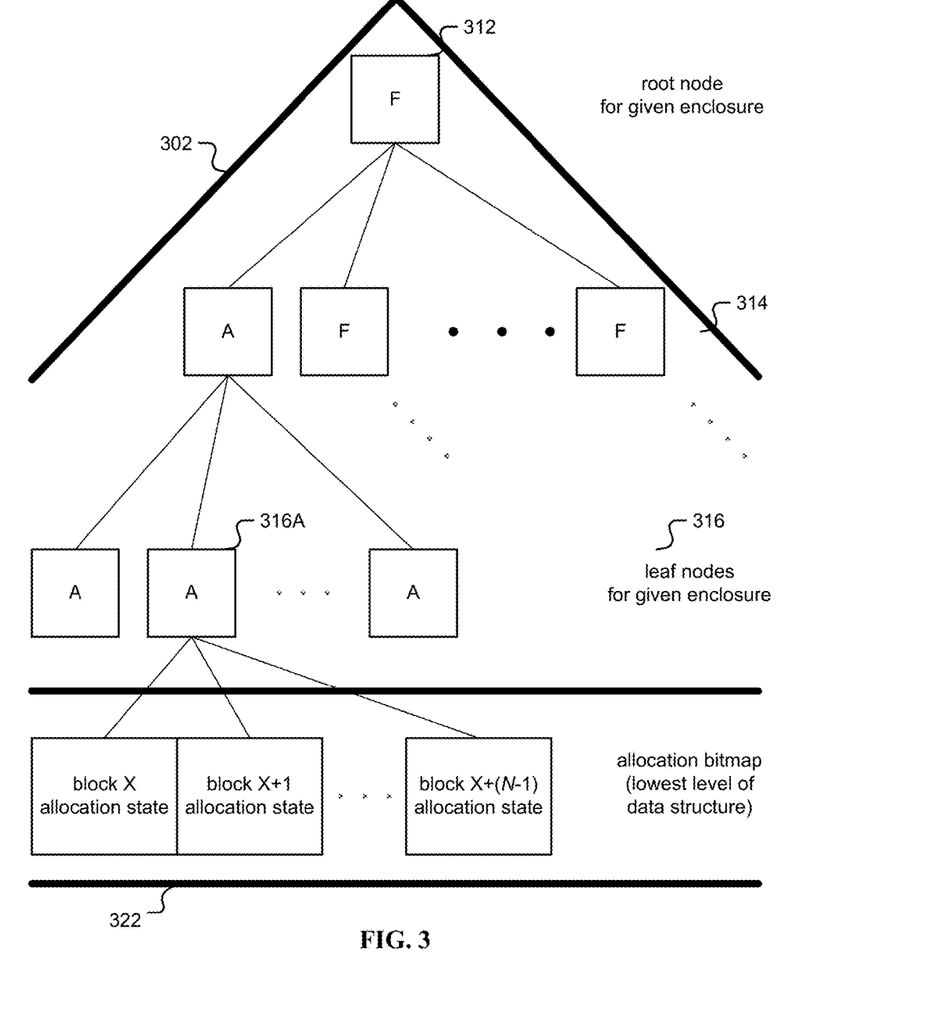
FIG. 3 is an illustration of a data structure for tracking allocation.

FIG. 3 is an illustration of a data structure for tracking allocation. The data structure of FIG. 3 may be stored in head server (202) of FIG. 2.

The data structure comprises a tree data structure (302) and an array (322). The tree data structure (302) is an N-ary tree to track bits/units for one allocation group and/or enclosure to allow efficient allocation state lookup. The tree data structure (302) includes a top root node (312) with a fanout of up to N for an N-ary tree, down to intermediate nodes (314), and further down to leaf nodes (316) for a given enclosure. Typically N is a multiple of the word length of a machine, such as 64.

The array (322) is the actual allocation bitmap (322) to track the states of each allocation unit, and with a fanout of up to N, then N array cells of array (322) are associated with one leaf node such as shown for leaf node (316A).

The states associated with the leaf nodes (316) of the tree are decided by the allocation states in the array (322), such that the leaf node (316A) presents the allocation state of all the N lower level units. When all the units in the lower level are considered "allocated", the upper level unit is also "allocated". This is also true within tree (302), wherein the the upper level units in the tree present the allocation states of N lower level units; when all the units in the lower level are considered "allocated", the upper level unit is also "allocated".

In the simple example for N=2, the following table is used, wherein "F" indicates the upper node is determined to be free based on the state of the two lower nodes, and "A" indicates the upper node is determined to be allocated:

TABLE 1

|  | Lower Node 1 is Free | Lower Node 1 is Allocated |
|---|---|---|
| Lower Node 2 is Free | F | F |
| Lower Node 2 is Allocated | F | A |

The size of the array/allocation bitmap (322) is equivalent to the size of all possible blocks/units for all enclosures.

Figure 4:
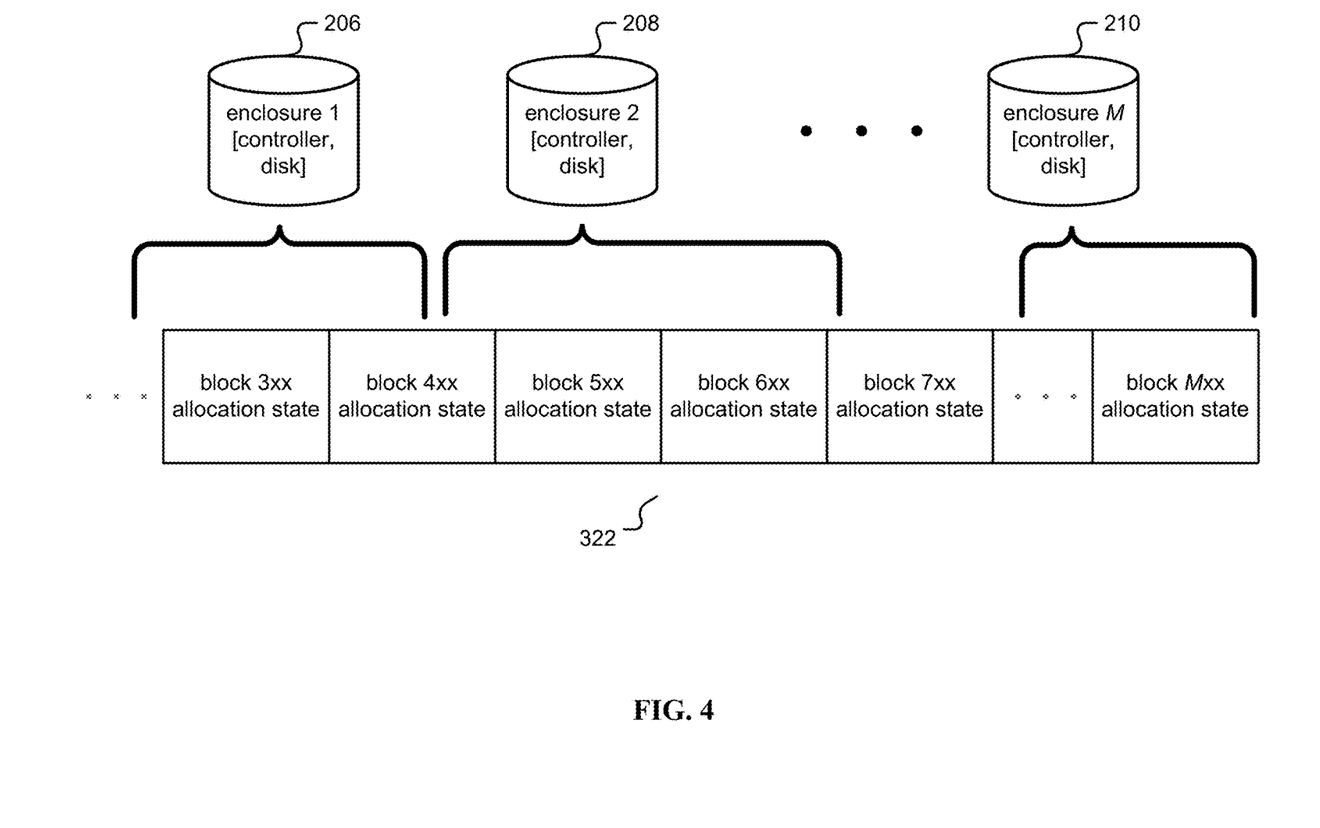
FIG. 4 is an illustration showing the size of the allocation bitmap.

FIG. 4 is an illustration showing the size of the allocation bitmap. Without limitation, the illustration is not drawn to scale. As is shown, each enclosure (206,208,210) comprises many blocks and so the block allocation bitmap (322) reflects this as it shows the allocation state for every block in an enclosure from 1 to M, and again as above M may be 56. The array (322) thus must show the allocation state for the entire system with actual, contemplated, and possible number of enclosures.

Figure 5A:
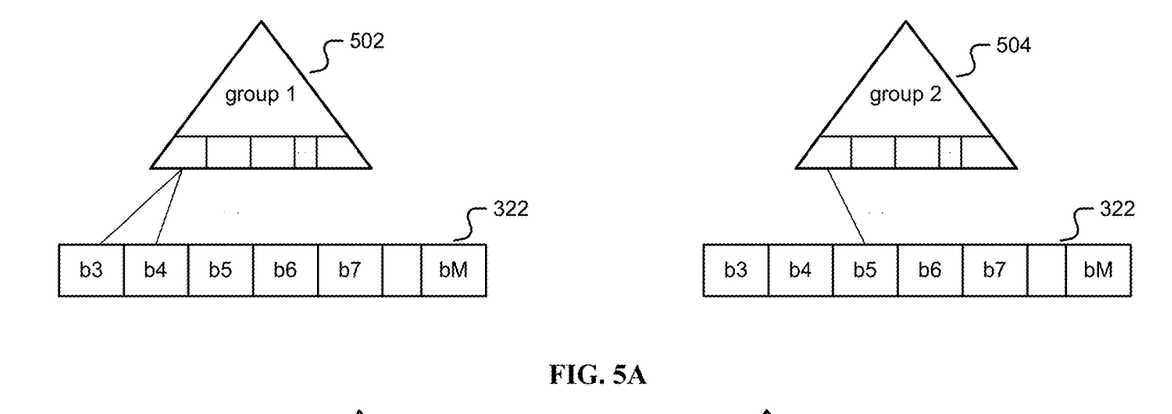
FIGS. 5A and 5B are example illustrations showing a data structure map for a simple dual enclosure with fanout of three.
Figure 5B:
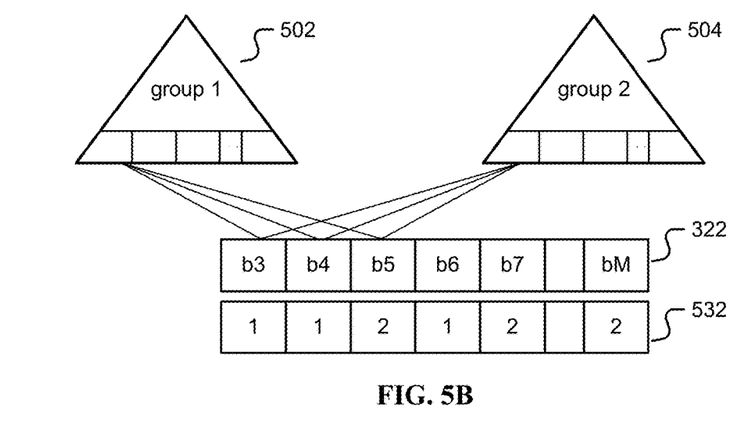

FIGS. 5A and 5B are example illustrations showing a data structure map for a simple dual enclosure with fanout of three.

Each tree is mapped to a group attribute and/or enclosure, for example tree 1 (502) for enclosure 1(206) and tree 2 (504) for enclosure 2(208). As can be shown by example in FIG. 5A, with parallel spindles, by block address the first enclosure stores blocks b3 and b4 and the second enclosure stores block b5.

The leaf state of either tree (502, 504) is decided both by its subordinate unit/bit states in the array (322) as well as by its associated group attributes/enclosure number. If the group attribute does not map to a given tree, for example (502), the array bit allocation state is taken as allocated. Thus, in the example shown in FIG. 5B, enclosure 1(206) and tree for group 1 (502) take the allocation state of b5 as "A"; and enclosure 2(208) and tree for group 2 (504) take the allocation state of b3 and b4 as "A".

If the group attribute maps the tree (502), the array bit allocation state is taken as-is. Thus, in the example shown in FIG. 5B, enclosure 1(206) and tree for group 1 (502) take the allocation state of b3 and b4 as their actual state, "A" or "F"; and enclosure 2(208) and tree for group 2 (504) take the allocation state of b5 as its actual state, "A" or "F". In this way, the tree (502) only tracks the free bits that have the same group attributes.

In one embodiment, a mask concept (532) is used to support associated group attributes.

For allocation, when a leaf node (316) is identified as free, the mask (532) is applied to its subordinate units/bits in the array (322) to identify the actual free allocation unit to exclude any free units/bits which do not belong to the allocation group associated with the tree/leaf node.

Similarly, when a bit is to be freed in the array (322), the same mask (532) is applied to the N−1 neighbor bits which share the same ruling leaf bit in the tree. If all the bits were previously allocated, the ruling leaf bit in the tree will be freed.

Figure 6:
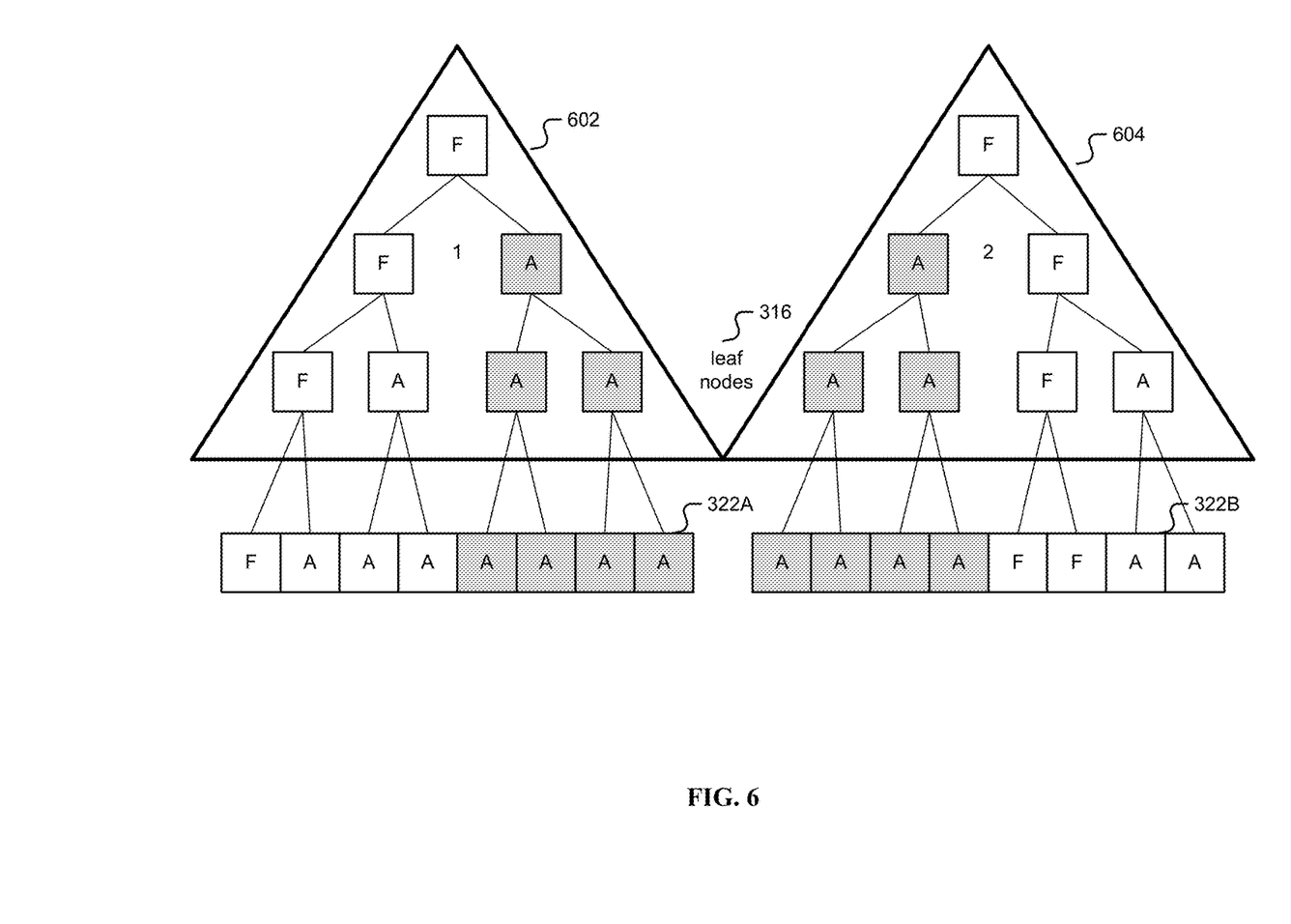
FIG. 6 is an illustration of a traditional system for block allocation tracking.

FIG. 6 is an illustration of a traditional system for block allocation tracking. In the example shown in FIG. 6, for the purpose of illustrational simplicity, an M=2 enclosure system is shown with a fanout of N=2.

As seen in FIG. 6, enclosure one(206) is associated with allocation group one and/or tree one (602), and enclosure two(208) is associated with allocation group two and/or tree two (604). The allocation bitmap indicates there are eight blocks systemwide across the two enclosures, and for the sake of simplicity is shown such that the first four blocks are associated with enclosure one (206), and the second four blocks are associated with enclosure two (208). As is traditional, the bitmap is repeated wholly for enclosure one(206) with bitmap (322A) and for enclosure two(208) with bitmap (322B). The bitmap cells are greyed out for bits not pertaining to the associated enclosure, but are still stored and require memory and computing resources to process.

Figure 7:
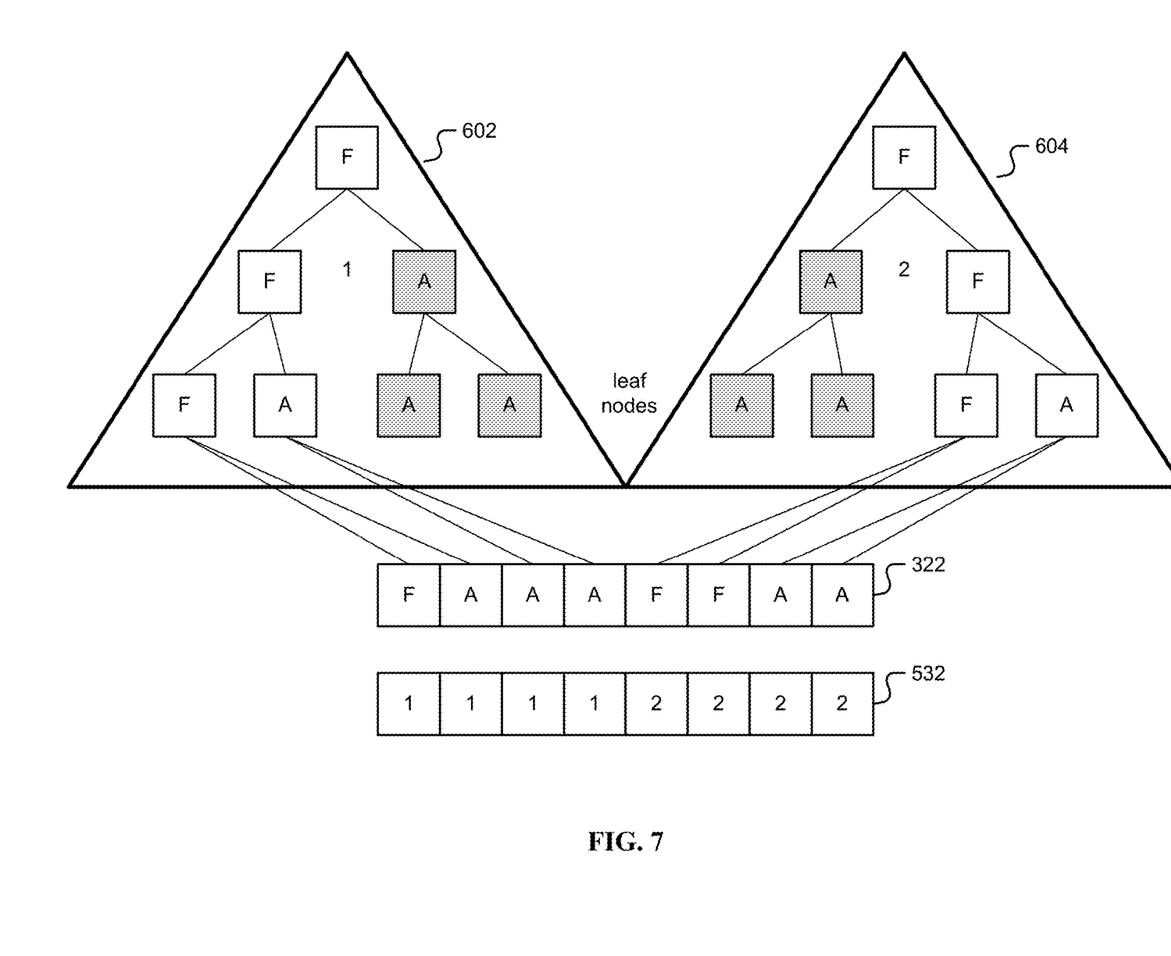
FIG. 7 is an illustration of the disclosed system for block allocation tracking.

FIG. 7 is an illustration of the disclosed system for block allocation tracking. As with FIG. 6, for the purpose of illustrational simplicity, an M=2 enclosure system is shown with a fanout of N=2.

By contrast with FIG. 6, only a single set of an allocation bitmap (322) and mask (532) are used, halving the memory and compute resources. These savings increases as the N fanout is increased. As can be seen in the trees, the root—to—leaf nodes are still represented in full for each tree (602-604) and nodes not associated with its own given enclosure are still greyed out in the example.

As described above, when sizing resources for an allocation data structure, both the array and the trees are sized statically as the maximum storage capacity supported to allow online growth. The memory requirement of a single tree is usually a fraction of the array, the fraction being decided by the fan-out configuration and breadth. The total tree memory footprint is the number of groups/enclosures supported multiplied by the single tree consumption. In one embodiment, it is configured to be negligible in comparison to the array's memory requirement, such that the total memory footprint is linear to the maximum capacity supported.

In comparing the system of FIG. 7 with traditional systems of FIG. 6 allocation map memory footprint is cut by M times, where M is the number of enclosures/allocation groups supported, because traditional methods simply allocate a full tree for each enclosure, including the array. Thus the traditional systems of FIG. 6 are equivalent to replicating the array (322) M times. In terms of performance, the new data structure depicted in FIG. 7 has only one extra operation of applying the mask (532), which shows no obvious performance degradation in practical experiments.

The optimization depicted in FIG. 7 is valuable for capacity scaling. As more enclosures/disk shelves are added into the system shown in FIG. 2, they are assigned to different allocation groups to maximize the I/O bandwidth utilization for better I/O throughput. With this optimization, the memory requirement is much more scalable as capacity is scaled up, and reduces the overall memory requirement of systems.

Figure 8:
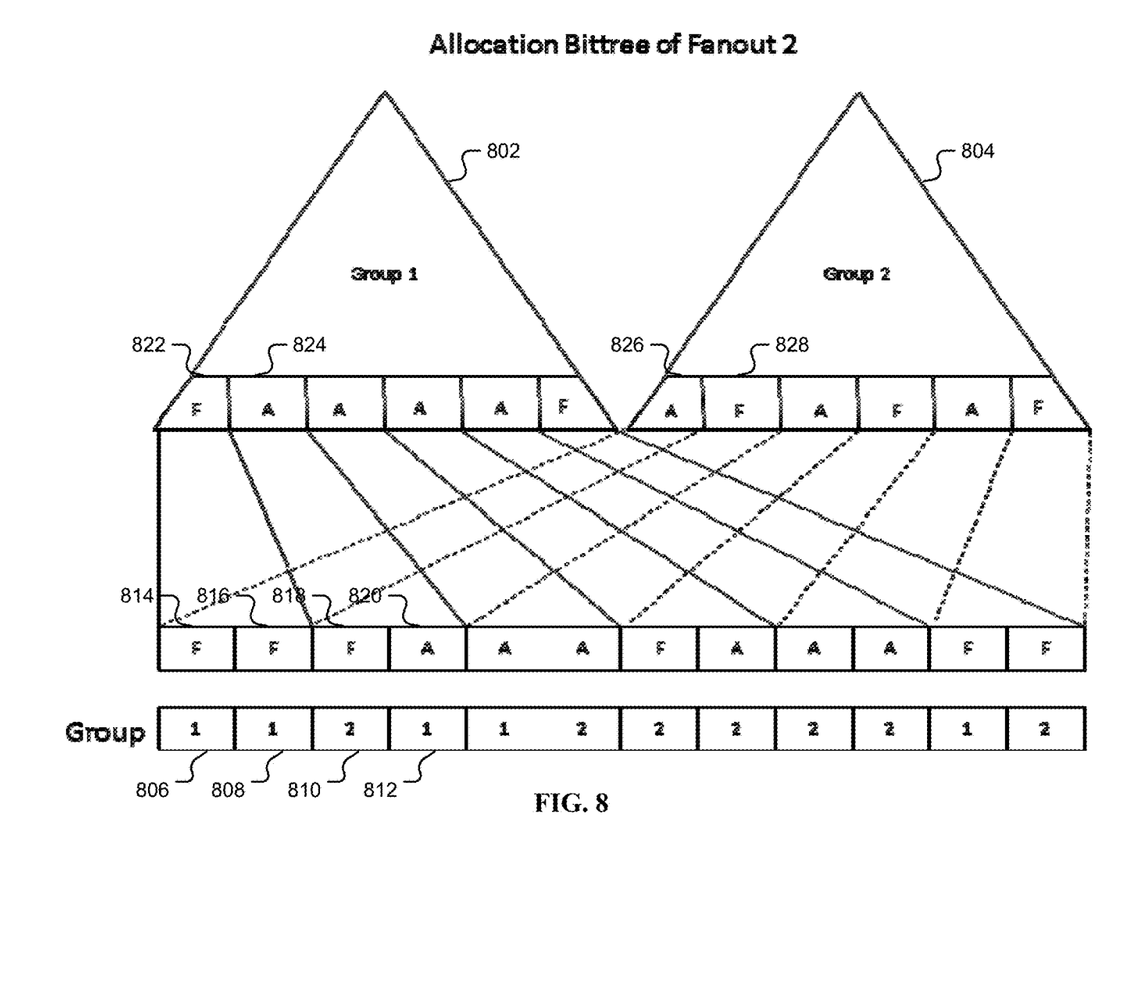
FIG. 8 is an illustration of a second example of the disclosed system for block allocation tracking.

FIG. 8 is an illustration of a second example of the disclosed system for block allocation tracking. As with FIG. 6, for the purpose of illustrational simplicity, an M=2 enclosure system is shown with a fanout of N=2.

Enclosure 1 (206) and allocation group 1 are associated with tree data structure 1 (802), and likewise enclosure 2 (208) and allocation group 2 are associated with tree data structure 2 (804).

The allocation bitmap/array (322) includes sequential blocks (814), (816), (818), (820), and the mask (532) includes the respective group values (806), (808), (810), and (812). The technique to compute leaf nodes of the trees (802), (804), is made as follows for the first two leaf nodes:
a. Units (814) and (816) are both "F", and both from (806), (808) group 1. Thus for tree 1 (802), they are both taken as-is as "F", resulting in leaf node (822) being set to "F" or free: ("F", "F")→"F", as described in Table 1.
b. Units (814) and (816) are both "F", and both from (806), (808) group 1. Thus for tree 2 (804), they are both taken only as "A" resulting in leaf node (826) being set to "A" or allocated: ("A", "A")→"A", as described in Table 1.
c. Unit (818) is "F" and (810) from group 2, and unit (820) is "A" and (812) from group 1. Thus for tree 1 (802), unit (818) is taken only as "A" and unit (820) is taken as-is as "A" resulting in leaf node (824) being set to "A" or allocated: ("A", "A")→"A", as described in Table 1.
d. Unit (818) is "F" and (810) from group 2, and unit (820) is "A" and (812) from group 1. Thus for tree 2 (804), unit (818) is taken as-is as "F" and unit (820) is taken only as "A" resulting in leaf node (828) being set to "F" or free: ("F", "A")→"F", as described in Table 1.

Other examples for the other leaf nodes are also shown in FIG. 8. Savings in memory and compute resources of 1/M or ½ are recognized by only requiring one bitmap array for the two trees.

Figure 9:
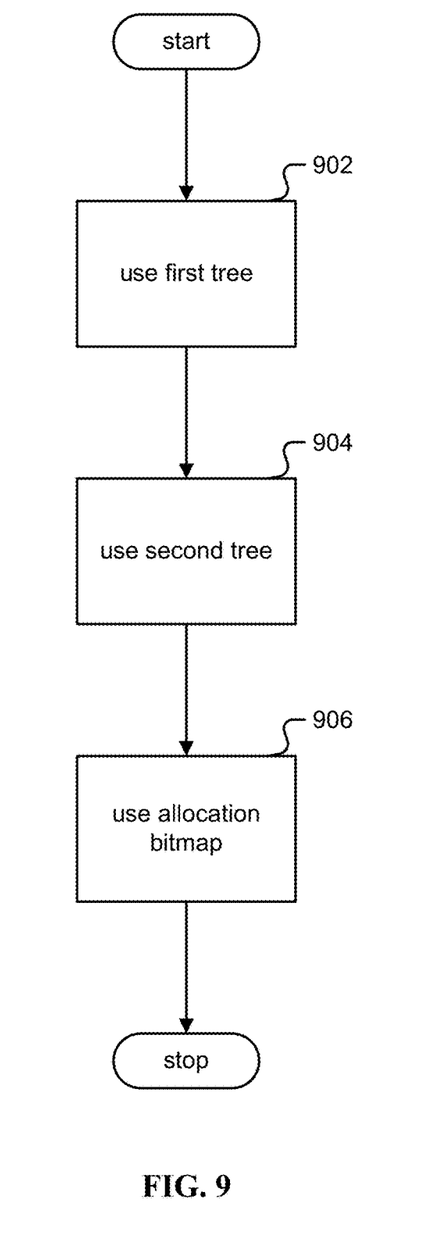
FIG. 9 is a flow chart illustrating an embodiment of a process for a memory efficient block allocation map to support online growth of different storage attributes.

FIG. 9 is a flow chart illustrating an embodiment of a process for a memory efficient block allocation map to support online growth of different storage attributes.

In step 902, a first tree data structure is used to track an allocation state for each block included in a first set of storage blocks. An example of a first tree data structure is tree (802) in FIG. 8. Upper level nodes in a given tree (802) present the allocation state of connected lower level nodes in the given tree, such that each allocation state indicates whether any associated storage blocks are free or "F".

In step 904, a second tree data structure is used to track an allocation state for each block included in a second set of storage blocks. An example of a second tree data structure is (804) in FIG. 8.

The first tree data structure (802) and the second tree data structure (804) each have a number of leaf nodes corresponding to a maximum number of blocks that can be included in a superset of storage blocks, wherein the first set of storage blocks and second set of storage blocks are included in the superset of storage blocks. As shown in FIG. 3, the number of leaf nodes corresponds to the fanout N of the tree such that for every N blocks in the superset there is one leaf node. As shown in FIG. 4, the superset of storage blocks includes all actual and contemplated enclosure sizes and quantities.

In step 906, an allocation bitmap associated with the superset of storage blocks is used to track allocation states of storage blocks in the superset. An example of the allocation bitmap is (322) in FIG. 3. Each leaf node of a specified tree, for example (802) or (804), is associated with a plurality of associated locations in the allocation bitmap as shown for example with units (814) and (816) being associated with leaf nodes (822) and (826).

In one embodiment, each location in the allocation bitmap (322) is associated with a corresponding storage block and is configured to be used to store data indicating an allocation state of that block. An allocation state as shown in Table 1 includes a state of "F"/free, or "A"/allocated.

In one embodiment, a first storage enclosure (206) comprises the first set of storage blocks. A second storage enclosure (208) comprises the second set of storage blocks. A head server (202), coupled to the first storage enclosure and the second storage enclosure services the two enclosures.

In one embodiment, the first tree data structure (802) is mapped to the first storage enclosure (206) and/or a first group attribute or group attribute of 1. The second tree data structure (804) is mapped to the second storage enclosure (208) and/or a second group attribute or group attribute of 2. A given leaf state is determined based at least on subordinate allocation bitmap states and their associated group attributes.

Figure 10:
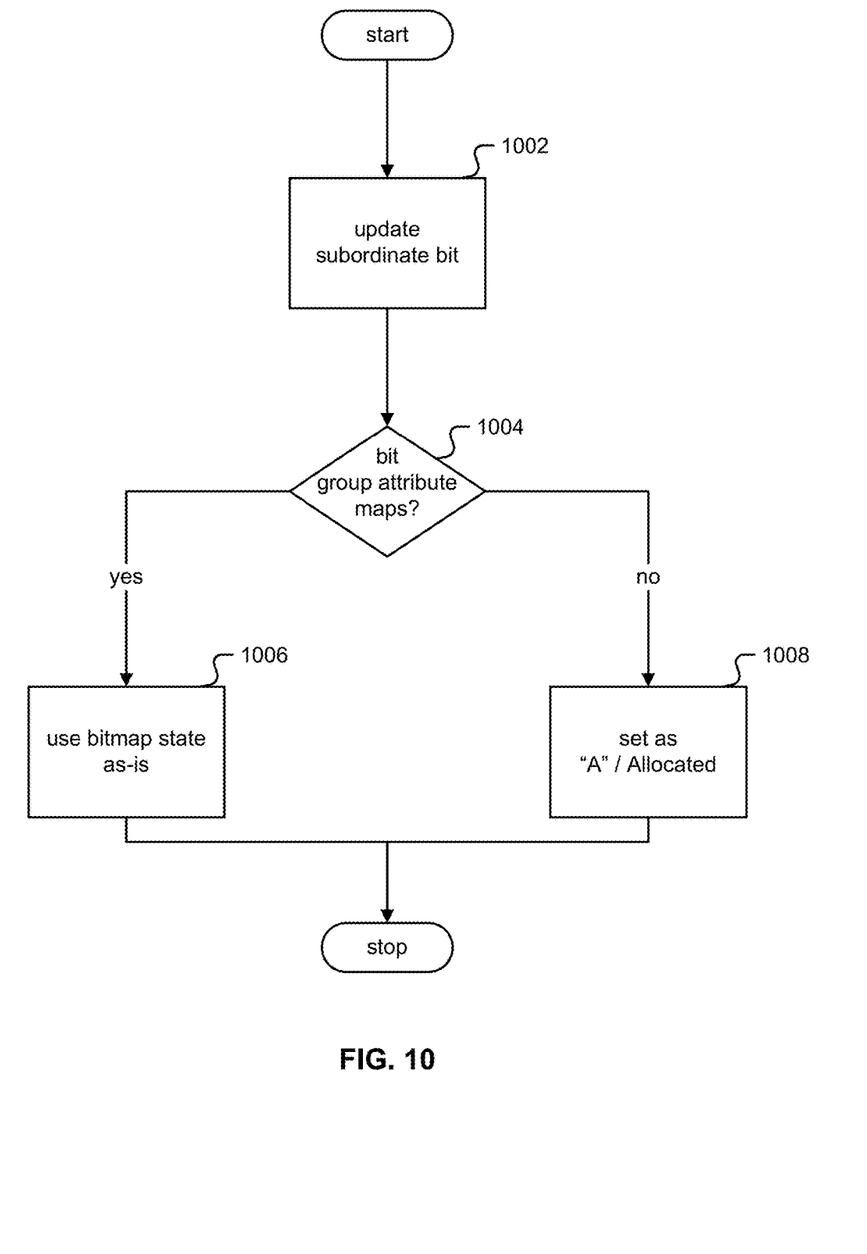
FIG. 10 is a flow chart illustrating an embodiment of a process for determining leaf state.

FIG. 10 is a flow chart illustrating an embodiment of a process for determining leaf state. Examples of this process are given in FIG. 8. In step 1002, an allocation state of a subordinate bit is updated, for example being allocated for a first time from "F" to "A", and so forth. In step 1004, it is determined if a bit group attribute maps to a specified associated enclosure and/or allocation group. For example, if the mask (532) of a bit related to the subordinate bit shows that the allocation group is 2 and the specified group is 2, then the bit group attribute is considered to be "mapped" and control transfers to step 1006; otherwise control transfers to step 1008. In step 1006 the bitmap state of the subordinate bit is used as-is, and/or whatever is reflected in the bitmap. In step 1008 the bitmap state of the subordinate bit is ignored and instead set as "A"/allocated for the purposes of determining the leaf state.

Another way to state this is that if the associated group attribute is the same as that mapped for the given leaf state, then the subordinate allocation bitmap state is used to determine the given leaf state, otherwise the subordinate allocation bitmap state is assumed to be fully allocated. The given leaf state is determined to be allocated in the event that all subordinate allocation bitmap states are determined allocated.

In one embodiment, a storage enclosure is a virtual machine logical spindle group. In one embodiment, a storage block is a storage bit. In one embodiment, a fanout of each tree data structure is equivalent to a number of neighbor allocation bitmap sharing a leaf node. In one embodiment, startup coordination of populating every tree data structure by a number of worker threads equal to the number of enclosures.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
use a first tree data structure to track an allocation state for each block included in a first set of storage blocks;
wherein upper level nodes in a given tree present the allocation state of connected lower level nodes in the given tree, such that each allocation state indicates whether any associated storage blocks are free;
use a second tree data structure to track an allocation state for each block included in a second set of storage blocks;
wherein the first tree data structure and the second tree data structure each have a number of leaf nodes corresponding to a maximum number of blocks that can be included in a superset of storage blocks, wherein the first set of storage blocks and second set of storage blocks are included in the superset of storage blocks;
use an allocation bitmap associated with the superset of storage blocks to track allocation states of storage blocks in the superset;
use a group mask to track which of the storage blocks in the superset is associated with the first set or the second set of storage blocks, wherein each leaf node of a specified tree is associated with a plurality of associated locations in the allocation bitmap and the group mask; and
a memory coupled to the processor and configured to store said first and second tree data structures.

2. The system recited in claim 1, wherein each location in the allocation bitmap is associated with a corresponding storage block and is configured to be used to store data indicating an allocation state of that block.

3. The system recited in claim 1, further comprising:
a first storage enclosure, comprising the first set of storage blocks;
a second storage enclosure, comprising the second set of storage blocks; and
a head server, coupled to the first storage enclosure and the second storage enclosure and comprising the processor and the memory.

4. The system as recited in claim 3, wherein:
the first tree data structure is mapped to the first storage enclosure and a first group attribute;
the second tree data structure is mapped to the second storage enclosure and a second group attribute; and
a given leaf state is determined based at least on subordinate allocation bitmap states and their associated group attributes.

5. The system as recited in claim 4, wherein if the associated group attribute is the same as that mapped for the given leaf state, then the subordinate allocation bitmap state is used to determine the given leaf state, otherwise the subordinate allocation bitmap state is assumed to be fully allocated.

6. The system as recited in claim 4, wherein the given leaf state is determined to be allocated in the event that all subordinate allocation bitmap states are determined allocated.

7. The system as recited in claim 4, wherein the processor is further configured to:
receive a request to allocated a storage block wherein an associated leaf node is identified as free; and
apply a mask to subordinate allocation bitmap states for the associated leaf node to identify free storage blocks, wherein the mask is based at least on associated group attributes.

8. The system as recited in claim 4, wherein the processor is further configured to:
receive a request to free a specific storage block;
apply a mask to each neighbor allocation bitmap states for the specific storage block, wherein each neighbor allocation bitmap states share a ruling leaf node;
in the event it is determined based at least on applying the mask that all storage blocks were allocated, the ruling leaf node is set to a free allocation state; and
wherein the mask is based at least on associated group attributes.

9. The system as recited in claim 3, wherein each storage enclosure is a virtual machine logical spindle group.

10. The system as recited in claim 3, wherein each storage block is a storage bit.

11. The system as recited in claim 1, wherein a fanout of each tree data structure is equivalent to a number of neighbor allocation bitmap sharing a leaf node.

12. The system as recited in claim 1, wherein the processor is further configured to populate every tree data structure by a number of worker threads equal to the number of enclosures.

13. The system as recited in claim 1, wherein the processor is further configured to, during allocation in the event a leaf node is identified as free, apply a mask to subordinate allocation bitmap units.

14. The system as recited in claim 13, wherein applying the mask identifies free allocation units for an associated given storage enclosure.

15. The system as recited in claim 13, wherein applying the mask excludes free allocation units which do not belong to an associated given storage enclosure.

16. The system as recited in claim 1, wherein the processor is further configured to, when a unit is freed in the allocation bitmap, apply a mask to neighbor units sharing a same ruling leaf node as the freed unit.

17. The system as recited in claim 16, wherein applying the mask includes freeing the same ruling leaf node in the event that all neighbor units were previously allocated.

18. A method comprising:
using a first tree data structure to track an allocation state for each block included in a first set of storage blocks;
wherein upper level nodes in a given tree present the allocation state of connected lower level nodes in the given tree, such that each allocation state indicates whether any associated storage blocks are free;
using a second tree data structure to track an allocation state for each block included in a second set of storage blocks;
wherein the first tree data structure and the second tree data structure each have a number of leaf nodes corresponding to a maximum number of blocks that can be included in a superset of storage blocks, wherein the first set of storage blocks and second set of storage blocks are included in the superset of storage blocks;

using an allocation bitmap associated with the superset of storage blocks to track allocation states of storage blocks in the superset; and using a group mask to track which of the storage blocks in the superset is associated with the first set or the second set of storage blocks, wherein each leaf node of a specified tree is associated with a plurality of associated locations in the allocation bitmap and the group mask.

19. The method as recited in claim 18, wherein each location in the allocation bitmap is associated with a corresponding storage block and is configured to be used to store data indicating an allocation state of that block.

20. A computer program product, the computer program product being embodied in a tangible computer readable storage medium and comprising computer instructions for:

using a first tree data structure to track an allocation state for each block included in a first set of storage blocks;

wherein upper level nodes in a given tree present the allocation state of connected lower level nodes in the given tree, such that each allocation state indicates whether any associated storage blocks are free;

using a second tree data structure to track an allocation state for each block included in a second set of storage blocks;

wherein the first tree data structure and the second tree data structure each have a number of leaf nodes corresponding to a maximum number of blocks that can be included in a superset of storage blocks, wherein the first set of storage blocks and second set of storage blocks are included in the superset of storage blocks;

using an allocation bitmap associated with the superset of storage blocks to track allocation states of storage blocks in the superset; and using a group mask to track which of the storage blocks in the superset is associated with the first set or the second set of storage blocks, wherein each leaf node of a specified tree is associated with a plurality of associated locations in the allocation bitmap and the group mask.

\* \* \* \* \*